United States Patent
Rang et al.

[11] Patent Number: 6,003,017
[45] Date of Patent: Dec. 14, 1999

[54] METHODS AND APPARATUSES FOR AUTOMATIC BANK SWITCHING IN A HOST ADAPTER MEMORY

[75] Inventors: Anton B. Rang, Hudson, Wis.; Kin C. Doe, Union City, Calif.; Gordon A. Minami, San Jose, Calif.; Daniel Olin Skeen, Morgan Hill, Calif.; Tonghan Tee, Milpitas, Calif.; James Lindeman, Fremont, Calif.; Peter Cheung, Milpitas, Calif.

[73] Assignee: Adaptec, Inc., Milpitas, Calif.

[21] Appl. No.: 08/866,427

[22] Filed: May 30, 1997

[51] Int. Cl.$^6$ .................................................. H04L 12/00
[52] U.S. Cl. .................................. 705/35; 360/40; 360/48
[58] Field of Search .......................... 705/35; 395/200.45; 360/40, 48, 49, 61

[56] References Cited

U.S. PATENT DOCUMENTS 5,630,076  5/1997  Saulpaugh et al. ..................... 395/284

*Primary Examiner*—Thomas R. Peeso
*Attorney, Agent, or Firm*—Martine Penilla & Kim, LLP

[57] ABSTRACT

A PCI to SCSI host adapter circuit is provided for use with different types of host platforms. The host adapter includes logic and controller circuits, and a memory having multiple drivers and a bank switching instruction set stored therein. During initialization, the first driver is loaded into the host's memory if the host's processor is of a compatible type. Otherwise, the bank switching instruction set is loaded into the host's memory and interpreted by the host's processor. During interpretation, the bank switching instruction set causes the host's processor to signal the logic circuit to request that the controller circuit re-map another driver to the location of the first driver in the memory. After this bank switching has occurred, the selected driver is loaded into the host's memory, provided of course that the host's processor is of a compatible type. This process may be repeated until the appropriate code type is found or the host processor is not supported.

22 Claims, 5 Drawing Sheets

METHODS AND APPARATUSES FOR AUTOMATIC BANK SWITCHING IN A HOST ADAPTER MEMORY

BACKGROUND OF THE INVENTION

1. Field of the Invention

This invention relates generally to computer systems and, more particularly to methods and apparatuses for use in a host adapter that is capable of supporting a variety of host platforms.

2. Description of the Related Art

Host adapters are used in computer systems to provide an interface between the host processor and one or more peripheral devices, such as, for example, a hard disk, a removable disk, an MO drive, a CD-ROM, a tape, a DAT, a Floptical® drive, and a scanner. Accordingly, host adapters are well suited to provide an interface between incompatible systems. By way of example, a host adapter can be used to interface a PCI compatible host to a SCSI compatible device, in which case the host adapter would be a PCI-to-SCSI host adapter. Of course other type of adapters are also available for other systems, standards, protocols and buses.

Most host adapters include both hardware and software components which act together to convert or otherwise translate signals passing between the host and the peripheral device. For example, an adapter typically includes an adapter circuit and driver software, such as an extended BIOS image, which are used by the host's processor during initialization and later to access the host adapter. As such, conventional host adapters are configured for use with a specific host processor, or specific types of platforms. For example, a PCI-to-SCSI host adapter can be configured to support the Intel Pentium® family of microprocessors, or the Motorola PowerPC® family of microprocessors which are found in many of today's personal computers and workstations.

With this in mind, FIG. 1a is a block diagram illustrating a typical computer system 10 having a host 12, a PCI bus 14, a PCI to SCSI host adapter 16, a SCSI bus 18, and a SCSI device 20. Host 12 represents a host processor, such as an Intel Pentium® microprocessor, a Motorola 68XXX, a PowerPC® microprocessor, or other microprocessor and associated support circuitry, such as a system memory and interfacing circuitry. As shown in this example, host 12 is coupled to host adapter 16 by way of PCI bus 14. As such, host adapter 16 is configured to receive PCI compatible data, addressing and control signals from PCI bus 14 and convert them to corresponding SCSI compatible data, addressing and controls signals which are then supplied to SCSI device 20 over SCSI bus 18. Likewise, host adapter 16 is also configured to receive SCSI compatible data, addressing and control signals from SCSI device 20 and convert them into corresponding PCI compatible data, addressing and controls signals which are then be supplied to PCI bus 14.

FIG. 1b is a block diagram illustrating a conventional PCI to SCSI host adapter 16, as in FIG. 1a, having a PCI bus connector 22, a logic circuit 24, a ROM 26, and a SCSI connector 28. PCI bus connector 22 represents a PCI compatible interface and physical connector for use in coupling host adapter 16 to PCI bus 14. Logic circuit 24 represents sequential, combinatorial, and/or other logic circuitry that is configured to interface with both the PCI bus and SCSI bus. ROM 26 is a read only memory (ROM) that contains operating instructions that can be read into the system memory within host 12 and executed by the processor within host 12 to access host adapter 16. The operating instructions stored within ROM 26 usually include either a BIOS image or some other type of PCI compatible platform operating system (OS) driver for use with a particular type of processor or processor family. By way of example, ROM 26 can include a PC BIOS image for use with Intel Pentium® processors. In which case, host adapter 16 would be configured for use with hosts that are Intel Pentium® based platforms. Another host adapter can, for example, include a PCI compatible platform OS driver for use with a Motorola PowerPC® based platform, such as those used in the Apple Macintosh® platforms. Of course additional processors/platforms could be serviced by other host adapters that are similarly configured with the proper driver stored in ROM 26.

One problem with conventional adapters, such as adapter 16 in FIG. 1b, is that these host adapters are platform specific. This tends to increase compatibility burdens for manufacturers and distributors of host adapters. Additionally, users may be burdened if they are unfortunate enough to have purchased and/or installed the wrong host adapter for their platform. All of this can lead to increased costs, customer discontent and decreased efficiency.

In view of the foregoing, there is a need for a multiple-platform compatible host adapter that is easy for the user to install, and inexpensive for the manufacturers and distributors to make and sell.

SUMMARY OF THE INVENTION

The present invention provides methods and apparatuses for use in a multiple-platform compatible host adapter that is automatically configurable to the type of platform in which it is connected. This multiple-platform compatible host adapter is therefore easy for the user to install, and relatively inexpensive for the manufacturers and distributors to make.

In accordance with one aspect of the present invention, a host adapter circuit is provided for use with different types of host platforms. The host adapter can, for example, include logic, controller circuits, and a memory in which a plurality of drivers, such as first and second drivers, and a bank switching instruction set are stored. During the host platform's initialization, the first driver can be loaded into the host's memory provided that the host's processor is of a compatible type. Otherwise, the bank switching instruction set can be loaded into the host's memory and interpreted by the host's processor, if the host's processor is of a compatible type. During interpretation, the bank switching instruction set can cause the host's processor to signal the logic circuit to request that the controller circuit re-map, or bank switch, the second driver to the location of the first driver in the memory. After this bank switching has occurred, the second driver is loaded into the host's memory.

In accordance with one embodiment of the present invention, there is provided an apparatus, such as, for example, a host adapter circuit or card, that can be used with a computer system having a processor. The apparatus includes logic, a memory and a controller circuit. The logic is capable of being coupled to the processor, for example, by way of a PCI bus and PCI interface circuitry. The logic is configured to receive one or more control signals from the processor and to output a control signal to the controller circuit in response to the control signals. The memory, for example, a read-only memory (ROM), is coupled to the logic. The memory is capable of storing at least two drivers and a bank switching instruction set. Each of the drivers, preferably, includes a different BIOS image for use with a specific type of the processor, such as, for example, an Intel Pentium® or Motorola PowerPC® microprocessor. The bank switching instruction set is for use with a specific type of the processor and can, for example, include FCode capable of being interpreted by way of an OpenFirmware interpreter running on the processor.

The controller circuit is coupled to both the memory and the logic. The controller circuit is configured to input the control output signal from the logic and, in response thereto, to output at least one addressing signal to the memory. The addressing signal(s) from the controller circuit effectively selects one of the drivers within the memory. Once a driver is selected, the driver can be loaded into the host platform and the BIOS image can be executed.

In accordance with another embodiment of the present invention, there is provided a method for automatically bank switching a ROM in a host adapter configured for use with a computer system that has a processor and a system memory. The method includes storing a first driver that can be used with a first type of the processor, and a bank switching instruction set that can be used with a second type of the processor in a primary region within the ROM. The method includes storing a second driver that can be used with a second type of the processor in a secondary region within the ROM.

The method further includes loading the first driver into the system memory if the processor is of the first type. The method includes loading the bank switching instruction set into the system memory if the processor is of the second type, and executing the bank switching instruction set with the processor. The method includes re-mapping the ROM, in response to the processor executing the bank switching instruction set, such that secondary region appears at a location of the first region, and loading the second driver as it appears at the location of the first region, into the system memory if the processor is of the second type.

Advantageously, by automatically selecting the proper driver in a host adaptor's ROM, the possibility of user error in installation and configuration is eliminated. Further, the burden on manufacturing and distribution is also eased by having one product that operates on a number of host microprocessor platforms. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Figure 1A:
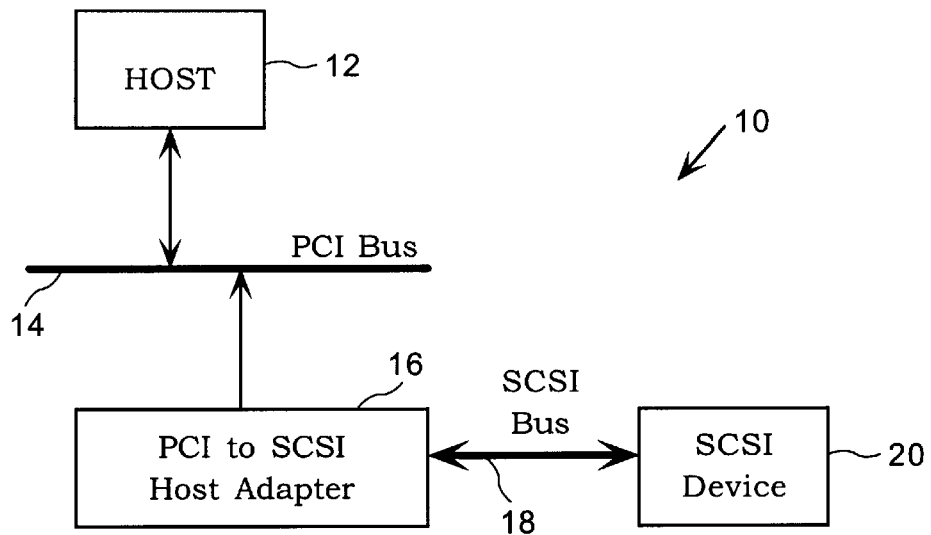
FIG. 1a is a block diagram illustrating a typical computer system having a PCI to SCSI host adapter.

The present invention will now be described in detail with reference to a few preferred embodiments thereof, as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

The present invention provides methods and apparatuses for use in a multipleplatform compatible host adapter that is easy for the user to use and install, and relatively inexpensive for the manufacturers and distributors to make. The methods and apparatuses include storing a plurality of host adapter drivers in a ROM and incorporating circuitry to automatically select the proper driver for the particular host platform during the initialization of the computer system. By making this configuration process automatic, the methods and apparatuses of the present invention reduce the burden on the user during installation. Advantageously, the methods and apparatuses of the present invention tend to reduce manufacturing and distribution costs by providing a single product that can operate on a multitude of host platforms.

By way of example, in accordance with one embodiment of the present invention, there is provided a PCI to SCSI host adapter and associated software that are capable of automatically selecting the proper driver from within the host adapter's ROM for the host platform. The PCI to SCSI host adapter includes a ROM that can store a plurality of drivers. For example, a plurality of drivers can be stored within in a plurality of memory BANKs, wherein each driver is for use with a specific type of host platform. During the initialization of the host platform and host adapter, the proper BANK (i.e., driver) within the ROM is automatically selected by way of a ROM controller circuit. The ROM controller circuit is capable of switching between BANKs in response to one or more signals from a logic circuit and/or the host's processor.

With this embodiment of the host adapter, the user does not need to be concerned with manually configuring the adapter to match the host platform. Instead, the user need only start-up the host system once the host adapter circuit has been properly connected. Those skilled in the art will recognize that the host adapter circuits described herein can, for example, be embodied in one or more integrated circuits on a mainboard within the host computer or a printed circuit card that can be connected thereto. When embodied in a host adapter card, the present invention provides a novel "plug and play", multiple platform compatible host adapter that reduces the likelihood of users misconfiguring the system.

Advantageously, when misconfigurations are substantially eliminated, customer satisfaction is increased.

Figure 2A:
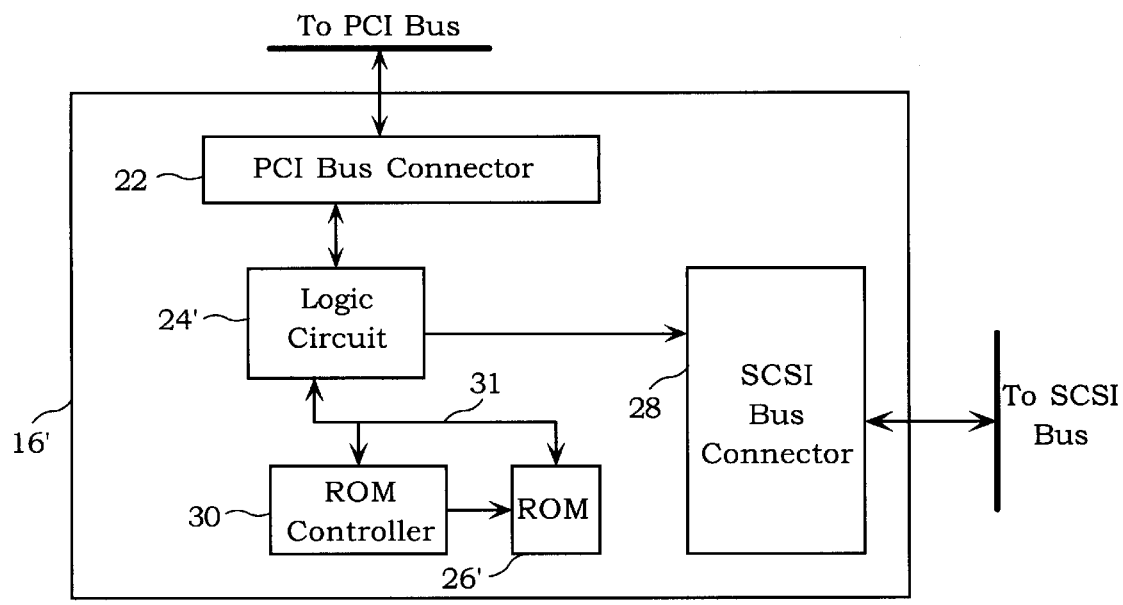
FIG. 2a is a block diagram illustrating a host adapter having a ROM controller capable of automatically configuring the host adapter for use with different types of host platforms in accordance with one embodiment of the present invention.

FIG. 2a is a block diagram of a multiple platform compatible host adapter 16' having a PCI bus connector 22, a logic circuit 24', an internal bus 31, a ROM 26', a SCSI bus connector 28, and a ROM controller 30. PCI bus connector 22 represents a PCI compatible interface and physical connector for use in coupling host adapter 16' to PCI bus 14. Logic 24' represents sequential, combinatorial, and/or other logic circuitry that is configured to interface with both the PCI bus and SCSI bus. Logic 24' is further coupled to ROM 26' by way of internal bus 31.

Figure 1B:
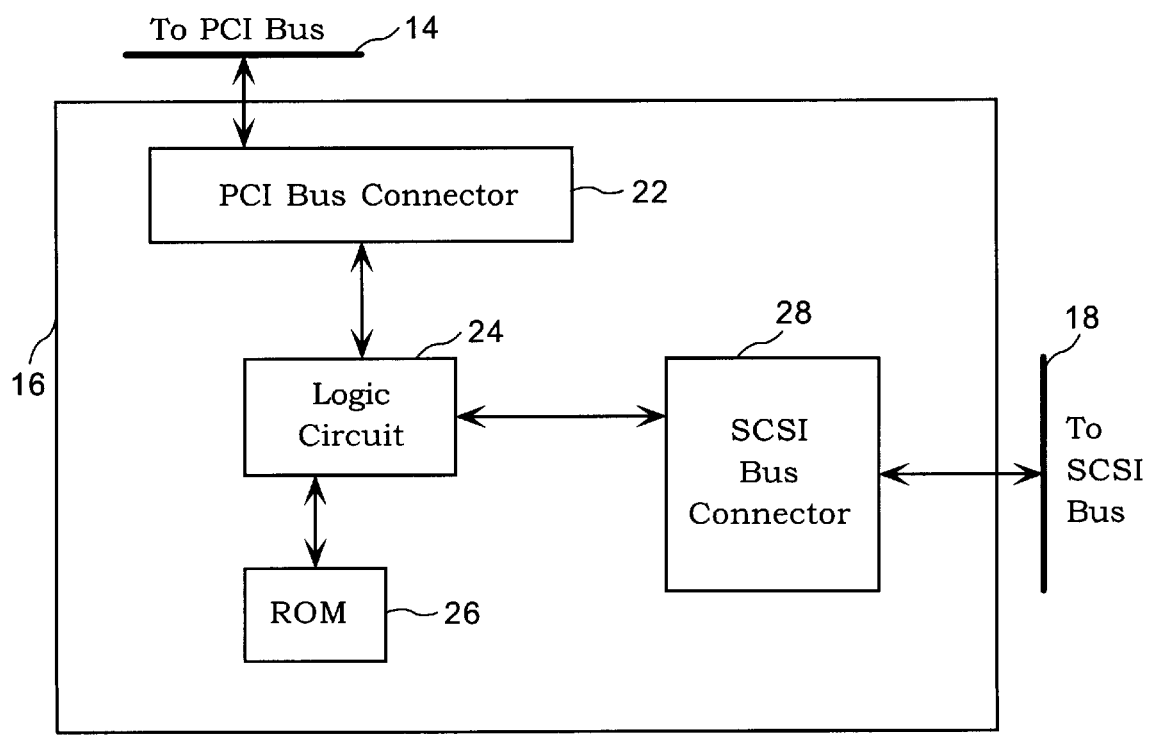
FIG. 1b is a block diagram illustrating a typical SCSI host adapter, as in FIG. 1a, for use with a specific host platform.

ROM 26' can be any type of read only memory (ROM) that is capable of storing a plurality of drivers and being accessed by host 12 via PCI bus 14, PCI bus connector 22, logic circuit 24' and internal bus 31. ROM 26' is a memory device that is configured to store at least two different drivers and an associated bank switching source code instruction set. As such, ROM 26' will usually need to be larger than the conventional ROM 26 illustrated in FIG. 1b. ROM controller 30 is coupled to ROM 26' and configured to output at least one signal to ROM 26' that identifies or otherwise selects the proper driver based on the type of host platform. As shown, ROM controller 30 receives at least one input from logic 24' that causes ROM controller 30 to select the proper driver. In a preferred embodiment, ROM controller 30 is a programmable, combinatorial and/or logic device that is configured to supply one or more address signals to ROM 26'. As discussed below, by properly setting one or more address signals, ROM controller 30 can effectively switch between one or more BANKs of memory within ROM 26'.

Figure 2B:
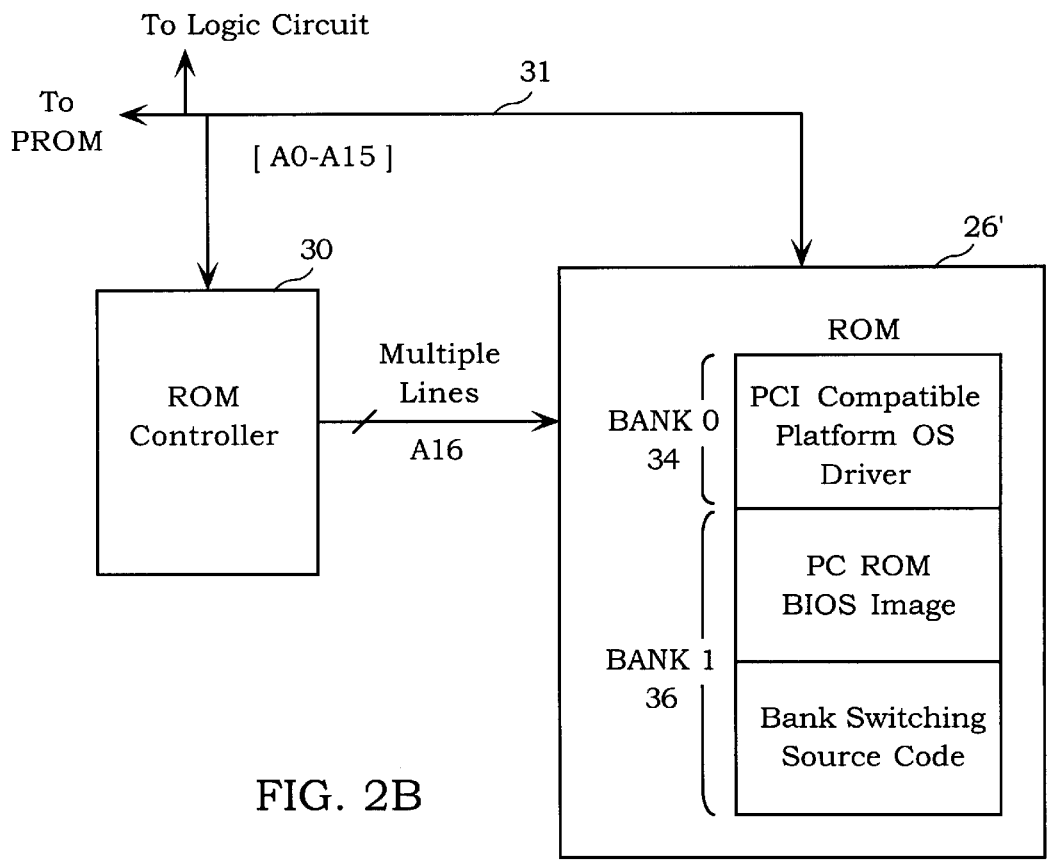
FIG. 2b is a block diagram illustrating the interface between the ROM controller and the ROM in FIG. 2a in accordance with one embodiment of the present invention.

FIG. 2b is a block diagram illustrating the interface between ROM controller 30 and ROM 26', in accordance with one embodiment of the present invention. As shown, address signals A0 through A15 are supplied to ROM 26' over internal bus 31. An additional address signal, A16, is supplied to ROM 26' by ROM controller 30. As such, ROM controller 30 can be used to select different BANKs of memory within ROM 26'. For exemplary purposes, two BANKs of memory, BANK0 34 and BANK1 36 are defined within ROM 26'. BANK0 34 extends from address "C" to address "D", and BANK1 36 extends from address "A" to address "C". Note that addresses A, B, C and D represent specific memory location addresses within ROM 26'.

In this exemplary embodiment, within BANK0 34, there is stored a PCI compatible platform OS driver 38. Driver 38 can, for example, be a driver suitable for use with a Motorola PowerPC® platform, or other non-Intel based platform. BANK1 36 is illustrated as having a PC ROM BIOS image 40 and bank switching source code 42, stored therein. PC ROM BIOS image 40 can, for example, be a driver suitable for use with an Intel Pentium® platform, or other Intel processor family platform. Switching source code 42 can, for example, be an OpenFirmware-compatible FCode image that is capable of being loaded and executed by the host processor using an OpenFirmware interpreter. Those skilled in the art will recognize that additional drivers and bank switching instruction sets can be included and used to configure the host adapter for other platform types.

Figure 2C:
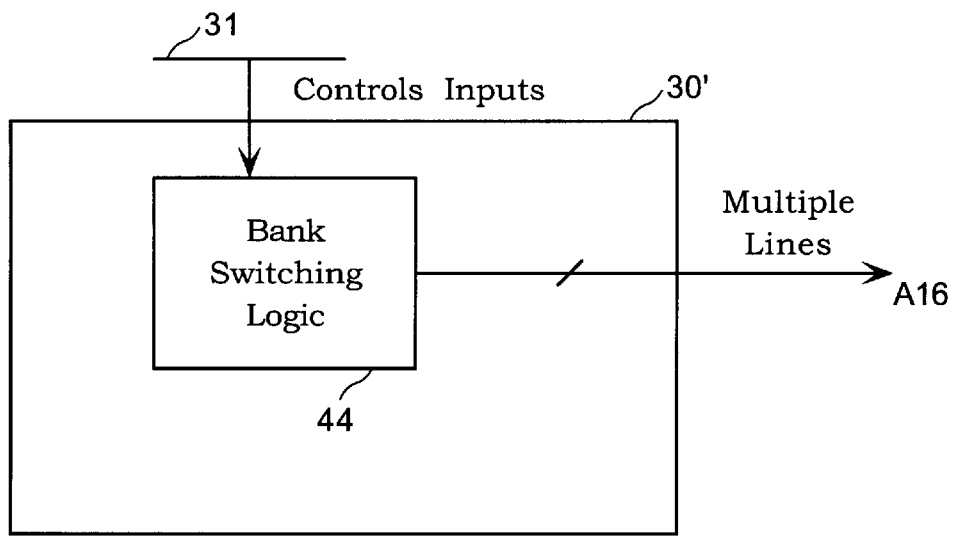
FIG. 2c is a block diagram illustrating one embodiment of a ROM controller, as in FIG. 2b, in accordance with the present invention.
Figure 2D:
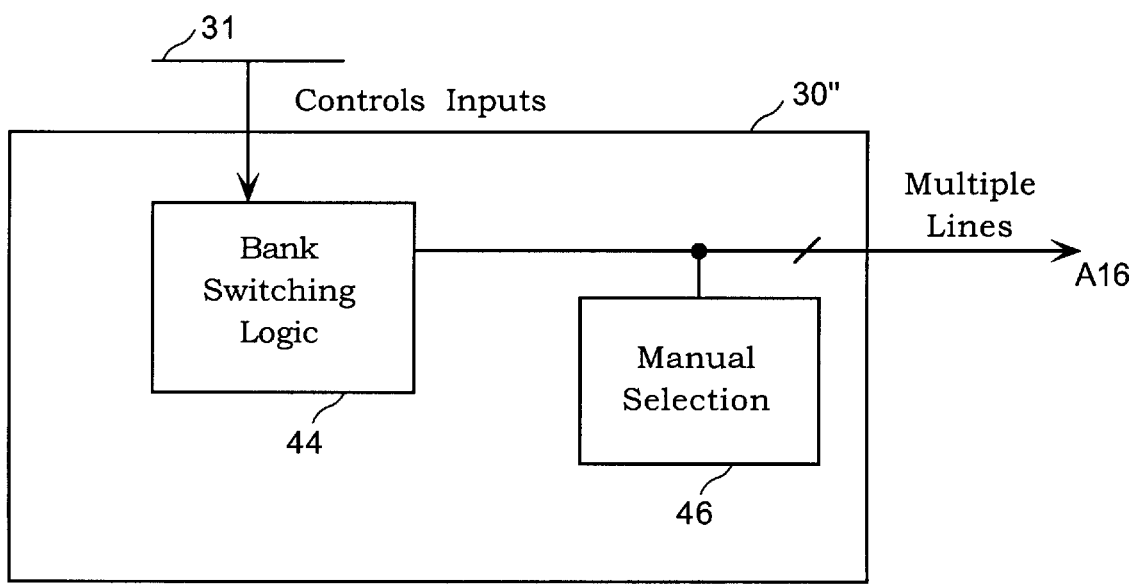
FIG. 2d is a block diagram illustrating yet another embodiment of a ROM controller, as in FIG. 2b, in accordance with the present invention.

Before discussing the operation of host adapter 16', additional embodiments of ROM controller 30 will be discussed. FIGS. 2c and 2d represent two different embodiments of ROM controller 30, in accordance with the present invention. FIG. 2c is a block diagram illustrating a ROM controller 30' having bank switching logic 44 therein. As shown, control inputs are supplied to bank switching logic 44 from internal bus 31 which cause bank switching logic 44 to toggle address signal A16 between a logic "high" (1) and logic "low" (0) voltage level. As will be discussed, the control inputs are used to identify the type of host platform driver to which the host adapter is currently connected.

FIG. 2d is a block diagram illustrating a ROM controller 30" having a bank switching logic 44 and a manual selection mechanism 46. Manual selection mechanism 46 can be used to manually configure which BANK of memory, e.g., BANK0 34 or BANK1 36, within ROM 26' will be accessed. Thus, manual selection mechanism 46 essentially overrides the output(s) of bank switching logic 44 and sets addressing signal A16 to either a 1 or 0. It was found that a manual selection mechanism was necessary for some platforms that are not completely PCI compliant. Those skilled in the art will recognize that manual selection mechanism 46 can be carried out by way of a variety of circuits and/or devices, including connecting terminals with jumper wires, switches, etc. In its preferred embodiment, manual selection mechanism 46 includes a terminal block and a jumper that can be configured to always provide either a 1 or a 0 to A16, or to not affect A16. Notice that for PCI-compliant platforms manual selection mechanism 46 is not required.

Figure 3A:
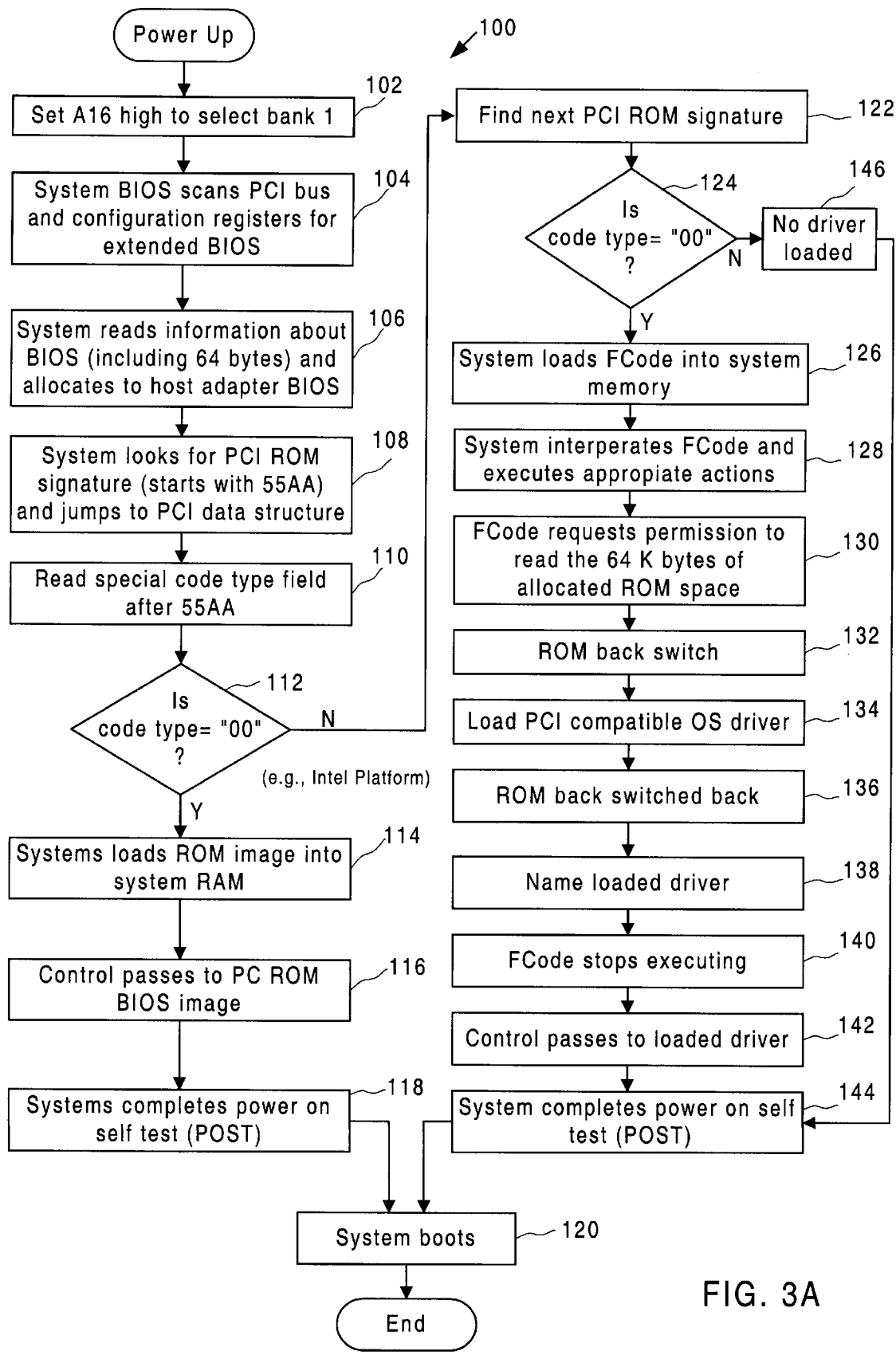
FIG. 3a is a flow-chart illustrating a method in accordance with one embodiment of the present invention, that can be used to automatically configure a host adapter for use with different types of host processors by way of a ROM BANK switching step.

With this in mind, FIG. 3a is a flow-chart illustrating a method 100 in accordance with one embodiment of the present invention, that can be used to automatically configure a host adapter for use with different types of host platforms. Method 100 begins when the host platform and host adapter are being powered-up. Note, that throughout method 100 it is assumed that no manual overrides are in place.

Beginning with step 102, method 100 includes automatically setting address signal or line A16 to a logical "high" (1), such that BANK1, within the host adapter's ROM, is selected. In step 104, the host system scans the PCI bus and configuration registers for extended BIOS. In step 106, the host system reads information from the host adapter about the existing BIOS contained within BANK1 of the host adapter's ROM, and allocates sufficient space (usually 64 Kbytes) within the host's memory in which to store the contents (e.g., driver, etc.) of BANK1.

Next, in step 108 the host system looks for a PCI ROM signature, which starts with "55AA", and jumps to the PCI data structure where the correct signature is found. In step 110 the host system reads the special code type field, which is a single byte field that follows immediately after "55AA". Those skilled in the art will recognize that, with the exception of step 102 (the setting of A16 to a 1), method 100 has thus far followed a conventional PCI bus and card initialization process.

In step 112, the host system, having found a code type after "55AA", determines if the type code is equal to "00". If the type code is "00" (e.g., the host system is compatible with an Intel-based BIOS), then method 100 proceeds to step 114 and the host system accesses the host adapter's ROM (BANK1) and loads the driver or ROM image therein into the host system's memory. Once this has been accomplished, the method 100 proceeds to step 116 where control is passed to the driver that was loaded into the host's memory in step 114. Next, in step 118, the host system completes a power-on self test (POST). Method 100 then proceeds to step 120 where the host system boots-up.

Steps 112 through 120 also represent conventional PCI operations, such as those used to initialize an Intel-based PC platform and a conventional host adapter. Notice that in prior art processes, if the code type did not equal "00" (as determined in step 112), then the host system would typically ignore the host adapter altogether and/or discontinue the initialization process.

Returning now to step 112, when the code type is not "00," and the host platform is not an IBM PC or Intel-based system, the system proceeds to find the next PCI ROM signature, as shown in step 122. Once the next PCI ROM signature has been found and the special code type field has been read, then method 100 proceeds to step 124, wherein, it is determined if the code type equals "01". If the code type does equal "01," then the method 100 proceeds to step 126, where the host system loads the bank switching source code, for example FCode, from BANK1 of the host adapter's ROM, into the host's memory.

Next, in step 128, the host system interprets the FCode and, as a result, executes appropriate actions. In step 130, the host system, in response to the FCode, requests permission from the host adapter to read the 64 Kbytes of allocated ROM space. As a result of this request, a ROM BANK switching process occurs in step 132. During the ROM BANK switching process, BANK0 is re-mapped so that it can be read as the 64 Kbytes of allocated ROM space (i.e., instead of BANK1, as originally configured). The ROM BANK switching process is discussed in greater detail below with reference to FIG. 3b.

Next, in step 134, the host system loads the driver from BANK0, such as, for example, a PCI compatible platform OS driver, into the host's memory. In step 136, another ROM BANK switching process occurs. During the ROM BANK switching process, BANK1 is re-mapped back so that it can be read as the 64 Kbytes of allocated ROM space, if needed. In step 138, the FCode names the loaded driver before it stops executing in step 140.

The method 100 then proceeds to step 142 where control is passed to the driver that was loaded into the host's memory in step 134. In step 144, the host system completes a power-on self test (POST). The method 100 then proceeds to step 120 where the host system boots-up as described above. Referring back to step 124, note that if the code type is not "01," then no driver is loaded in step 146 and the method 100 jumps ahead to step 144, as described above.

Figure 3B:
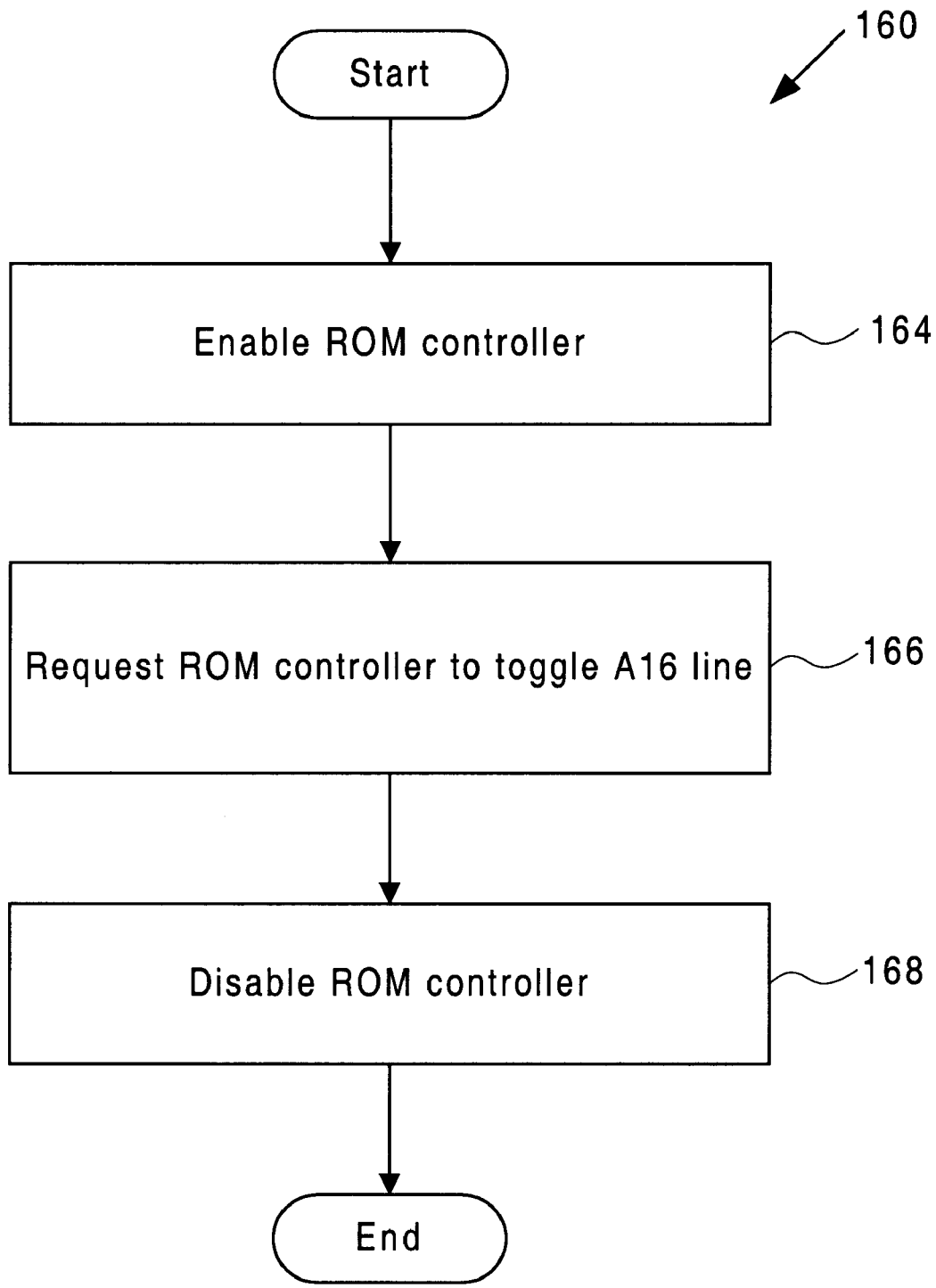
FIG. 3b is a flow-chart illustrating a method that can be used to effect a ROM BANK switching step, as in FIG. 3a, and in accordance with one embodiment of the resent invention.

FIG. 3b is a flow-chart illustrating, in accordance with one embodiment of the present invention, a ROM BANK switching process 160, as in steps 132 and 136 of FIG. 3a. As shown, in step 164, the FCode and host processor cause the logic circuit within the host adapter to enable a ROM controller within the host adapter. Next, in step 166, the ROM controller is requested, by way of the logic circuit, to toggle (logically) the A16 address line that is coupled to the host adapter's ROM. In the case of step 132, the A16 line is toggled from a logical 1 to a logical 0. Conversely, in step 136, the A16 line is toggled from a logical 0 to a logical 1. After the A16 line has been toggled, the ROM controller is disabled by the logic circuit in step 168.

Those skilled in the art will recognize that there are several possible embodiments for the logic and ROM controller circuits in ROM BANK switching process 160. For example, the logic circuit may be embodied in a programmable logic device that is configured to receive one or more PCI control signals from the host's processor via a PCI bus. The logic circuit can include one or more I/O registers that identify when a ROM BANK switching process is to occur. Based on the status of the register(s), additional control inputs can be generated which causes the ROM controller to toggle the logical status of the A16 address line.

It is recognized that the methods and apparatuses of the present invention can be further extended to provide automatic bank switching for a plurality of drivers and BANKs of memories stored within the host adapters ROM. While the present invention discloses using the A16 address line to switch between BANKs, it is within the scope of this invention to use a plurality of address lines to set each of them individually or in groups to switch between a plurality of BANKs and/or to switch between larger or different sized BANKs of memory in the ROM.

While this invention has been described in terms of several preferred embodiments, there are alterations, permutations, and equivalents which fall within the scope of this invention. It should also be noted that there are many alternative ways of implementing both the process and apparatus of the present invention. It is therefore intended that the following appended claims be interpreted as including all such alterations, permutations, and equivalents as fall within the true spirit and scope of the present invention.

What is claimed is:

1. An automatic bank switching apparatus for use with a computer system having a processor, said automatic bank switching apparatus comprising:

a data storage means for storing two or more sets of computer instructions for use with a host adapter, wherein each of said computer instructions is for use with a specific type of said processor; and a bank switching means for identifying said type of said processor based on one or more inputs from said processor and establishing which of said two or more sets of computer instructions are to be provided by said host adapter to said processor for use by said processor.

2. The automatic bank switching apparatus as recited in claim 1, wherein said two or more sets of computer instructions can be stored in different regions of said data storage means, and said data storage means further includes an addressing means for serially addressing said data storage means such that said addressing means can switch between said different regions within said data storage means.

3. An apparatus for use with a computer system having a processor, the apparatus comprising:

logic capable of being coupled to said processor, said logic being configured to receive one or more control signals from said processor and to output a control input signal in response thereto;

a memory coupled to said logic, said memory including at least two drivers and a bank switching instruction set, wherein each of said at least two drivers includes a different BIOS image for use with a specific type of said processor, and said bank switching instruction set is for use with at least one of said specific type of said processor; and a controller circuit coupled to said memory and said logic and configured to receive said control input signal from said logic and in response thereto to output at least one addressing signal to said memory that selects one of said at least two drivers within said memory.

4. The apparatus as recited in claim 3, wherein said memory is capable of being sequentially addressed by a plurality of addressing signals.

5. The apparatus, as recited in claim 3, wherein said memory is configured into at least two BANKs of memory, and wherein each of said BANKs of memory includes one of said drivers, and one of said BANKs of memory further includes said bank switching instruction set.

6. The apparatus as recited in claim 5, wherein said bank switching instruction set includes FCode that is capable of being interpreted by said specific type of said processor.

7. The apparatus as recited in claim 6, wherein when said specific type of said processor interprets said FCode, and outputs said one or more control signals to said logic which causes said logic to output said control input signal to said controller circuit which then toggles a logic state of said at least one addressing signal.

8. The apparatus as recited in claim 7, wherein said at least one addressing signal is an uppermost addressing signal selected from a plurality of addressing signals capable of sequentially addressing said memory.

9. The apparatus as recited in claim 3, wherein within each of said drivers there is a code type field indicating said specific type of said processor that can be used with said BIOS image located therein.

10. The apparatus as recited in claim 3, further comprising a PCI interface for use in coupling said logic to said processor.

11. The apparatus as recited in claim 9, further comprising a non-PCI interface-coupled to said logic, and wherein said logic is further configured to provide an interface between said PCI interface and said non-PCI interface.

12. The apparatus as recited in claim 3, wherein said controller circuit further includes a bank switching logic and a manual selection mechanism, wherein said manual selection mechanism is configurable by the user to set said at least one addressing signal to a specific logic state.

13. A computer system comprising:
   a processor;
   a PCI bus coupled to said processor;
   a system memory coupled to said processor and said PCI bus; and
   a host adapter coupled to said PCI bus, said host adapter including;
      logic coupled to said processor via said PCI bus, said logic configured to receive one or more control signals from said processor and output a control input signal in response thereto;
      a memory coupled to said logic, said memory being capable of storing at least two drivers and a bank switching instruction set, wherein each of said drivers includes a different BIOS image for use with a specific type of said processor, and said bank switching instruction set is for use with at least one of said specific type of said processor; and
      a controller circuit coupled to said memory and said logic and configured to receive said control input signal from said logic and in response thereto to output at least one addressing signal to said memory that selects one of said at least two drivers within said memory.

14. The computer system as recited in claim 13, wherein said memory is capable of being sequentially addressed by a plurality of addressing signals.

15. The computer system as recited in claim 13, wherein said memory is configured into two separate regions, and wherein each of said regions includes one of said drivers, and one of said regions further includes said bank switching instruction set.

16. The computer system as recited in claim 15, wherein said bank switching instruction set includes FCode that is capable of being loaded into said system memory and interpreted by said processor.

17. The computer system as recited in claim 16, wherein when said processor interprets siad FCode and outputs said one or more control signals over said PCI bus to cause said logic to output said control input signal to said controller circuit which causes said controller circuit to change a logic state of said at least one addressing signal.

18. The computer system as recited in claim 17, wherein said at least one addressing signal is an uppermost addressing signal selected from said plurality of addressing signals.

19. The computer system as recited in claim 13, wherein within each of said drivers, there is a code type field indicating said specific type of said processor that can be used with said BIOS image located therein.

20. The computer system as recited in claim 19, further comprising a non-PCI interface coupled to said logic, and wherein said logic is further configured to provide an interface between said PCI bus and said non-PCI interface.

21. The computer system as recited in claim 20, wherein said controller circuit further includes bank switching logic to generate said at least one addressing signal, and a manual selection mechanism that can override said bank switching logic and set said at least one addressing signal to a specific logic state.

22. A method for automatic bank switching a ROM in a host adapter for use with a computer system having a processor and a system memory, the method comprising:
   storing a first driver and a bank switching instruction set in a primary region within said ROM, said first driver for use with a first type of said processor, and said bank switching instruction set for use with a second type of said processor;
   storing a second driver in a secondary region within said ROM, said second driver for use with said second type of said processor;
   loading said first driver into said system memory if said processor is of said first type;
   loading said bank switching instruction set into said system memory if said processor is of said second type;
   running said bank switching instruction set with said processor if said processor is of said second type;
   re-mapping said ROM, in response to said processor running said bank switching instruction set, such that said secondary region appears at a location of said first region when read by said processor; and
   loading said second driver as it appears at said location of said first region, into said system memory if said processor is of said second type.

* * * * *